May 30, 1939.  M. SAVIO  2,160,565

FLUID PRESSURE CYLINDER

Filed Oct. 2, 1935  3 Sheets-Sheet 1

FROM BRAKE VALVE

Inventor

Michele Savio

By N. D. Parker Jr. Attorney

May 30, 1939.                M. SAVIO                    2,160,565
                      FLUID PRESSURE CYLINDER
              Filed Oct. 2, 1935           3 Sheets-Sheet 2

Inventor
Michele Savio
By N. D. Parker Jr.
Attorney

Inventor
Michele Savio
By N. Warker
Attorney

Patented May 30, 1939

2,160,565

UNITED STATES PATENT OFFICE 2,160,565

FLUID PRESSURE CYLINDER

Michele Savio, Turin, Italy

Application October 2, 1935, Serial No. 43,278
In Great Britain October 15, 1934

2 Claims. (Cl. 121—38)

This invention relates to fluid pressure cylinders for actuating brakes or other devices and has for its object to provide an improved brake cylinder device of the kind adapted to be operated by a reduction of the value of the pressure or vacuum obtaining in one chamber of the cylinder device with respect to the value of the pressure or vacuum normally obtaining in this chamber and substantially constantly obtaining in another chamber of the cylinder device.

As usually constructed a brake cylinder device of the kind referred to comprises a single movable abutment having the two chambers arranged one on each side of the abutment, the latter being operatively connected to the brake or other device to be operated, and as will be evident, inasmuch as both of these chambers must normally contain fluid at a pressure greater or less than atmospheric pressure, the rod or its equivalent operatively connecting the abutment to the brake or other device must be provided with a packing gland or its equivalent where it passes through the cylinder wall.

According to the present invention, however, each of the two chambers referred to hereinbefore is arranged to be defined by an abutment and the hermetically sealed walls of the cylinder device, the two abutments being arranged to be operatively connected at their other sides which are exposed to atmospheric pressure to the brake or other device to be operated.

In order that the invention may be readily understood several embodiments thereof will now be described by way of example, with reference to the accompanying drawings in which.

Figure 1:
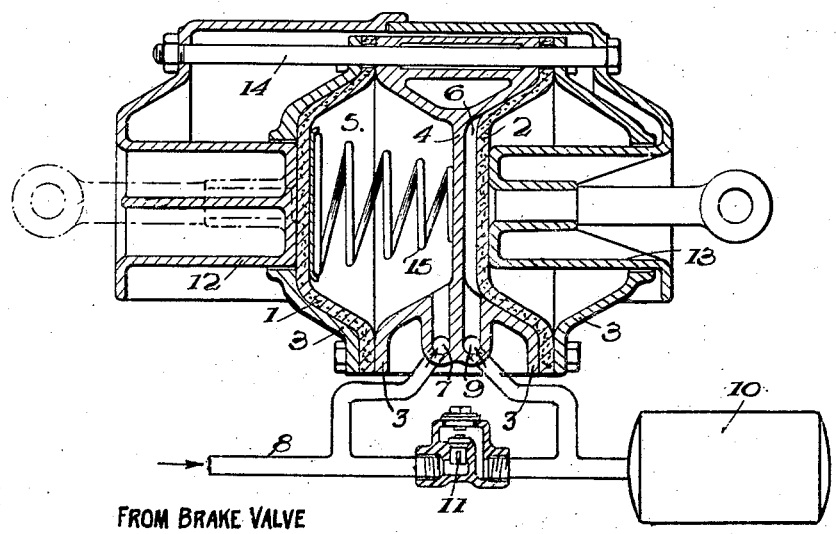
Figure 1 is a sectional view illustrating a fluid pressure brake cylinder in which the two chambers are coaxial and defined by two abutments and the hermetically sealed walls of a common cylinder casing.
Figure 2:
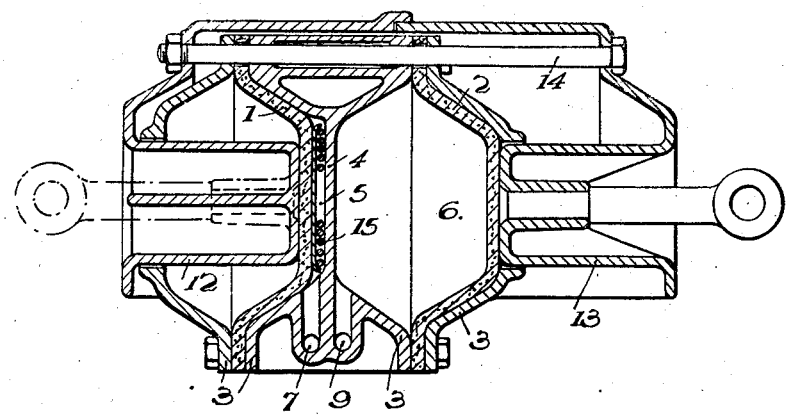
Figure 2 is a similar view to Figure 1 but illustrating the parts in the application position, the parts being in the release position as shown in Figure 1.

Referring first to Figures 1 and 2 the two movable abutments consist of flexible diaphragms 1 and 2 located coaxially in the casing 3 of the cylinder device, a web 4 of the casing dividing the space between these two flexible diaphragms into two chambers 5 and 6. The chamber 5 is connected through a passage 7 directly to the brake pipe and the chamber 6 is connected through a passage 9 to a reservoir 10 in communication with the brake pipe 8 through a non-return valve 11. The flexible diaphragms 1 and 2 are operatively connected to the brake or other device to be operated by members 12 and 13 abutting against the diaphragm, the two members 12 and 13 being operatively connected to one another by a rod 14 and adapted to slide on this rod which extends through apertures in the fixed casing 3 of the cylinder device.

Assuming that the cylinder is to be operated by fluid under pressure, fluid under pressure is normally supplied to the brake pipe 8 whence it flows directly to the chamber 5 and through the non-return valve 11 to the reservoir 10 and chamber 6. A spring 15 located in the chamber 5 maintains the diaphragms 1 and 2 and members 12 and 13 applied thereto in the left-hand position in which, for instance, the brakes are released.

When fluid under pressure is vented from the brake pipe automatically or under the control of a driver's brake valve device the pressure obtaining in the chamber 5 is reduced whilst that obtaining in the reservoir 10 and the chamber 6 remains substantially constant owing to the provision of the non-return valve 11 with the result that the fluid pressure acting on the diaphragm 2 causes the two diaphragms 1 and 2 and the two members 12 and 13 applied thereto to move to the right, as shown in Figure 2, and apply the brakes.

Figure 3:
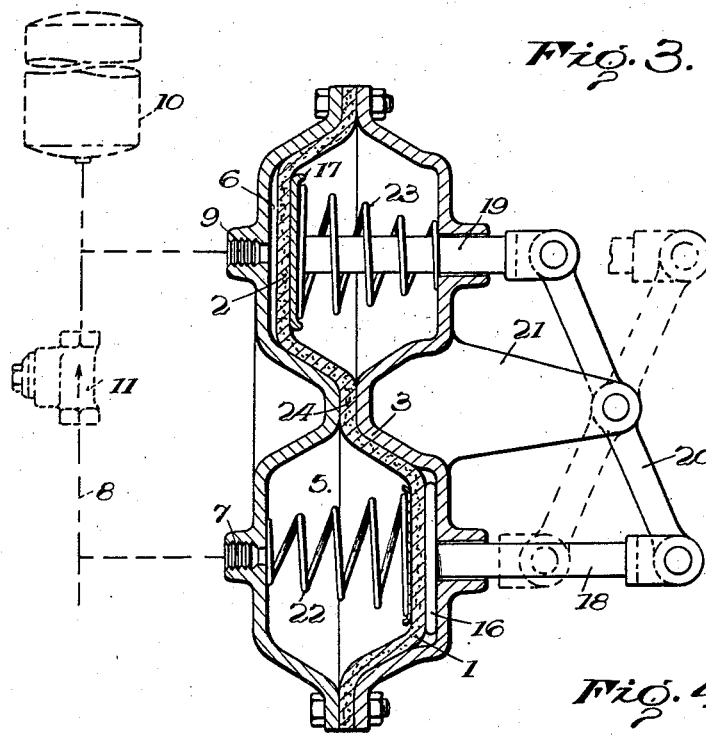
Figure 3 is a sectional view of a further embodiment of the invention in which the two chambers are arranged side by side in a common cylinder casing.

In a modified form of the invention illustrated in Figure 3 the two abutments 1 and 2 are located in the casing 3 of the brake cylinder device side by side, that is to say with their axes not coaxial but parallel to one another, these diaphragms 1 and 2 being operatively connected to the brake or other device to be operated through the intermediary of follower plates 16 and 17 carried by rods 18 and 19 connected to the opposite ends of a lever 20 pivotally mounted at a central point therein on a bracket member 21 carried by the casing 3, springs 22 and 23 being associated with the diaphragms to hold the latter in their non-operative positions. In this constructional embodiment of the invention the two flexible diaphragms 1 and 2 may be joined at one side 24 thereof.

Figure 4:
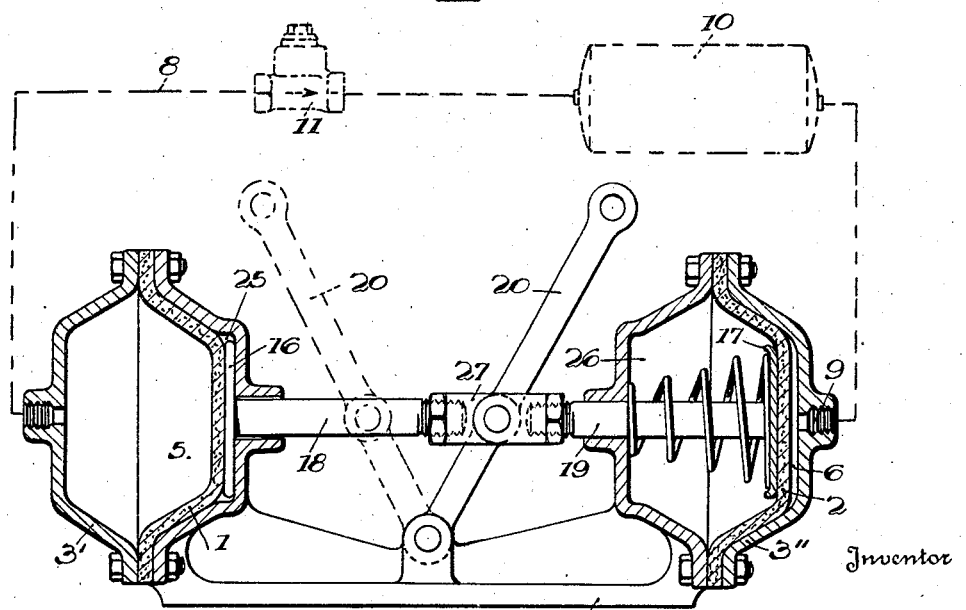
Figure 4 is a sectional view of a still further embodiment of the invention in which the two chambers are arranged coaxially in separate cylinder casings.

In a further embodiment of the invention illustrated in Figure 4 the cylinder device comprises two separate cylinder casings 3' and 3" connected by a bracket member 28 and containing the flexible diaphragms 1 and 2 operatively connected at the sides in chambers 25 and 26 subject to atmospheric pressure through the intermediary of follower plates 16 and 17 to rods 18 and 19 connected by a member 27 adapted to cooperate with a lever 20 connected to the brake or other device to be operated.

The operation of the latter two embodiments of the invention will be understood from the description hereinbefore of the operation of the first embodiment of the invention.

Figure 5:
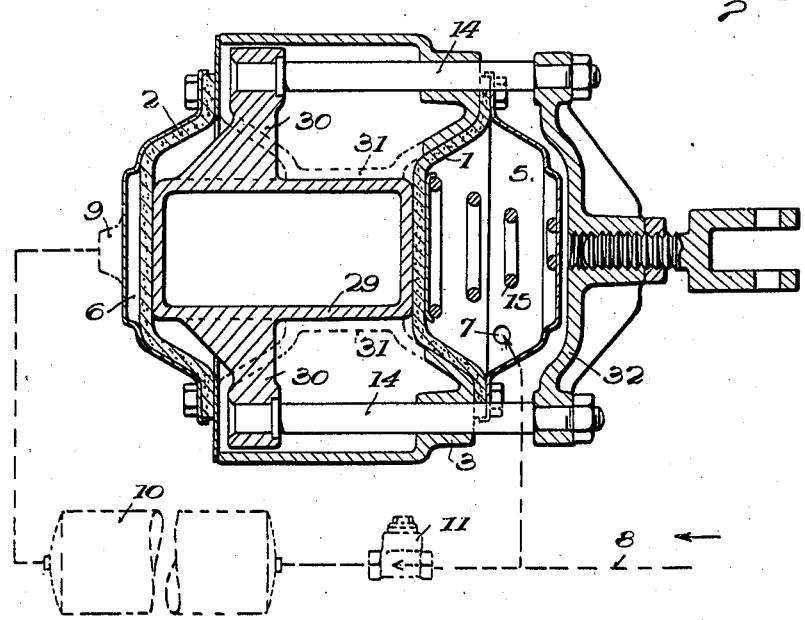
Figures 5 and 6 are sectional views of still further embodiments of the invention.
Figure 6:
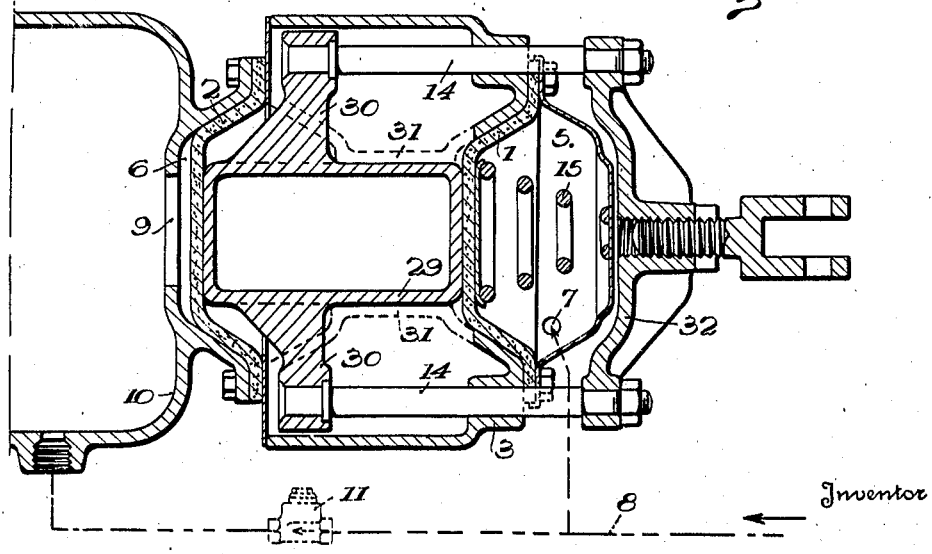

Referring now to Figure 5, the diaphragms in this embodiment of the invention abut against an intermediate member 29 having lugs 30 extending through slots 31 in the casing 3 of the device and carrying rods 14 extending through apertures in the casing 3 and connected to a cross-head 32 adapted to be connected to the brake or other device to be operated. Figure 6 illustrates an embodiment of the invention similar to that illustrated in Figure 5 but as shown in Figure 6 the reservoir 10 is formed integrally with the casing 3 of the device.

It will be understood that the invention is not limited to the particular construction and arrangement of the parts hereinbefore described which may be varied as desired to suit particular requirements without exceeding the scope of the invention.

Having now described my invention, what I claim as new and desire to secure by Letters Patent is:

1. A fluid pressure cylinder for actuating a brake or other device comprising a solid wall dividing said cylinder into a pair of chambers of substantially equal volume, a movable abutment in each chamber defining, in conjunction with the wall, the limits of said chamber, said abutments being of equal area and subjected on one side to atmospheric pressure and on the other side to the pressure in said chamber, means for operatively connecting said abutments on the sides exposed to atmospheric pressure to the device to be actuated, resilient means in one of said chambers interposed between the abutment therein and said wall, means for charging both chambers with fluid under pressure to the same degree, and means exhausting one of said chambers while retaining the other charged for effecting combined movement of said abutments and device to be actuated.

2. A fluid pressure actuator comprising a housing having a solid wall dividing the same into a pair of chambers of substantially equal volume, a pressure-responsive member in each chamber, said members being of equal area, means for constantly subjecting one side of each of said members to atmospheric pressure, means for connecting said members together and to a device to be actuated, means for supplying said chambers with fluid under pressure, resilient means in one chamber and disposed between said wall and the member therein for normally maintaining the connected members in inoperative position, and means for exhausting fluid pressure from said last named chamber while retaining the other chamber charged with fluid pressure for effecting combined movement of said connected members and device to be actuated.

MICHELE SAVIO.